US009881445B2

(12) United States Patent
Morrow

(10) Patent No.: US 9,881,445 B2
(45) Date of Patent: Jan. 30, 2018

(54) GAMING MACHINE AND A METHOD OF GAMING

(75) Inventor: James William Morrow, Las Vegas, NV (US)

(73) Assignee: Aristocrat Technology Australia Pty Limited, North Ryde, NSW (AU)

( * ) Notice: Subject to any disclaimer, the term of this patent is extended or adjusted under 35 U.S.C. 154(b) by 489 days.

(21) Appl. No.: 13/113,570

(22) Filed: May 23, 2011

(65) Prior Publication Data

US 2011/0294559 A1 Dec. 1, 2011

Related U.S. Application Data

(60) Provisional application No. 61/349,078, filed on May 27, 2010.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ................................ *G07F 17/3223* (2013.01)

(58) Field of Classification Search
CPC ....... A63F 13/49; A63F 13/493; A63F 13/497
USPC ....................... 463/1, 9, 20, 31, 35; 345/419
See application file for complete search history.

(56) References Cited

U.S. PATENT DOCUMENTS

| | | | | |
|---|---|---|---|---|
| 4,948,138 | A | 8/1990 | Pease | |
| 6,319,125 | B1 * | 11/2001 | Acres | G07F 17/32 463/25 |
| 6,749,514 | B1 * | 6/2004 | Moriwaki et al. | 463/43 |
| 6,758,757 | B2 | 7/2004 | Luciano, Jr. et al. | |
| 6,823,419 | B2 | 11/2004 | Berg | |
| 7,207,883 | B2 | 4/2007 | Nozaki | |
| 7,278,068 | B1 | 10/2007 | Crowder, Jr. | |
| 7,470,192 | B2 | 12/2008 | Yamamoto | |
| 7,654,904 | B2 | 2/2010 | Yamagami | |
| 8,147,311 | B2 * | 4/2012 | Mori | 463/13 |
| 2002/0042299 | A1 * | 4/2002 | Soltys | G06Q 10/0639 463/29 |
| 2002/0183105 | A1 * | 12/2002 | Cannon | A63F 13/08 463/4 |
| 2003/0190949 | A1 * | 10/2003 | Williams | G07F 17/32 463/24 |
| 2004/0054840 | A1 | 3/2004 | Berg | |

(Continued)

FOREIGN PATENT DOCUMENTS

| | | |
|---|---|---|
| CA | 2151990 | 12/1995 |
| CA | 2586535 | 4/2001 |

(Continued)

*Primary Examiner* — Kevin Y Kim
(74) *Attorney, Agent, or Firm* — Armstrong Teasdale LLP

(57) ABSTRACT

A gaming machine arranged to implement a base game and associated method are described. The gaming machine includes a game implementer arranged to implement a game and to generate game state information indicative of the current state of the game as the game is played by a player; and a data storage device arranged to store the game state information as the game is played by the player; the game implementer being arranged to retrieve game state information and to recommence play of the game by the player when the game state information is retrieved.

32 Claims, 6 Drawing Sheets

(56) References Cited

U.S. PATENT DOCUMENTS

| | | | |
|---|---|---|---|
| 2004/0142751 | A1 | 7/2004 | Yamagami |
| 2004/0192432 | A1* | 9/2004 | Walker ................ G07F 17/3269 463/20 |
| 2004/0198479 | A1 | 10/2004 | Martinek |
| 2005/0119052 | A1 | 6/2005 | Russell |
| 2005/0176493 | A1 | 8/2005 | Nozaki |
| 2006/0068918 | A1 | 3/2006 | Nagano |
| 2007/0015559 | A1* | 1/2007 | Zalewski ................ G06F 3/017 463/1 |
| 2007/0060331 | A1 | 3/2007 | Martin |
| 2007/0105609 | A1 | 5/2007 | Okada |
| 2007/0238509 | A1 | 10/2007 | Hishinuma |
| 2008/0076546 | A1 | 3/2008 | Moyle |
| 2008/0076562 | A1 | 3/2008 | Toyoda |
| 2008/0076564 | A1 | 3/2008 | Toyoda |
| 2008/0090650 | A1 | 4/2008 | Tarantino |
| 2008/0139292 | A1 | 6/2008 | Toyoda |
| 2008/0242394 | A1 | 10/2008 | Sakuma |
| 2008/0254893 | A1* | 10/2008 | Patel ................... G07F 17/3276 463/42 |
| 2008/0287186 | A1 | 11/2008 | Sakuma |
| 2009/0074191 | A1 | 3/2009 | Gatto |
| 2009/0209350 | A1 | 8/2009 | Kelly |
| 2009/0239622 | A1 | 9/2009 | Fujimori |
| 2009/0253477 | A1 | 10/2009 | Teranishi |
| 2009/0264195 | A1 | 10/2009 | Kompella |
| 2011/0070940 | A1* | 3/2011 | Jaffe et al. ...................... 463/20 |
| 2011/0117992 | A1* | 5/2011 | Nelson et al. .................. 463/20 |
| 2011/0117996 | A1* | 5/2011 | Rommerdahl et al. ......... 463/20 |
| 2011/0118003 | A1* | 5/2011 | Nakamura ...................... 463/20 |
| 2011/0287826 | A1* | 11/2011 | Kato et al. ...................... 463/20 |

FOREIGN PATENT DOCUMENTS

| | | |
|---|---|---|
| DE | 3129550 | 4/1982 |
| DE | 3802197 | 8/1989 |
| DE | 10307093 | 9/2004 |
| EP | 1443476 | 8/2004 |
| EP | 1571610 | 9/2005 |
| EP | 1662446 | 5/2006 |
| EP | 1672600 | 6/2006 |
| EP | 1890231 | 2/2008 |
| GB | 2373156 | 9/2002 |
| GB | 2448402 | 10/2008 |
| JP | 2289289 | 11/1990 |
| JP | 7163747 | 6/1995 |
| JP | 2002306789 | 10/2002 |
| JP | 2003210732 | 7/2003 |
| JP | 2004267340 | 9/2004 |
| JP | 2005095598 | 4/2005 |
| JP | 2007000672 | 1/2007 |
| JP | 2007000673 | 1/2007 |
| JP | 2007029634 | 2/2007 |
| JP | 2007330601 | 12/2007 |
| JP | 2007330602 | 12/2007 |
| JP | 2009061344 | 3/2009 |
| JP | 2009061345 | 3/2009 |
| JP | 2009061346 | 3/2009 |
| JP | 2009061347 | 3/2009 |
| JP | 2009061348 | 3/2009 |
| KR | 20060135621 | 12/2006 |
| MX | 2007010957 | 11/2007 |
| MX | 2007011042 | 11/2007 |
| WO | 2005029814 | 3/2005 |
| WO | 2006098931 | 9/2006 |
| WO | 2006118005 | 11/2006 |
| WO | 2007024512 | 3/2007 |
| WO | 2008127870 | 10/2008 |
| WO | 2010019356 | 2/2010 |

* cited by examiner

GAMING MACHINE AND A METHOD OF GAMING

CROSS REFERENCE TO RELATED APPLICATIONS

The present application relates to and claims the benefit of priority from U.S. Provisional Patent Application No. 61/349,078, filed on May 27, 2010, which is herein incorporated by reference in its entirety.

FIELD

The present invention relates to a gaming system, an electronic gaming machine and to a method of gaming.

BACKGROUND

It is known to provide a gaming system which includes a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a graphical display device.

It is also known to provide a networked gaming arrangement wherein players of different networked electronic gaming machines are linked together such that the players compete against each other for example for game prizes or bonus prizes.

However, while such gaming systems provide users with enjoyment, a need exists for alternative gaming systems in order to maintain or increase player enjoyment.

BRIEF SUMMARY

In accordance with a first aspect of the present invention, there is provided a gaming machine including:

a game implementer arranged to implement a game and to generate game state information indicative of the current state of the game as the game is played by a player; and a data storage device arranged to store the game state information as the game is played by the player;

the game implementer being arranged to retrieve game state information and to recommence play of the game by the player when the game state information is retrieved.

In one embodiment, the game includes a base game and a feature game, and the game implementer is arranged to implement a base game and based on defined criteria to implement a feature game, the game state information relating to the base game and/or the feature game.

In one embodiment, the game state information includes information indicative of the degree of progress achieved by the player through the game.

The game implemented by the game implementer may include a plurality of game levels and the game state information may include information indicative of the level of the game achieved by the player.

The outcome of the game implemented by the game implementer may be at least partially dependent on player skill and/or may be at least partially random.

In one embodiment, the gaming machine is arranged to provide an award based on the degree of progress through the game achieved by the player.

In one embodiment, the gaming machine is arranged to store game state information associated with multiple players. With this embodiment, the gaming machine may be arranged to provide an award based on a comparison between respective game state information associated with the players.

In one embodiment, the gaming machine is arranged to identify a player and to associate the stored game state information with the identified player.

In one arrangement, the gaming machine includes a player identification device arranged to read player identification information from a player identifier associated with the player. The player identification device may form part of a player tracking module and the player identifier may form part of a player tracking device associated with a player.

In one embodiment, the player tracking device includes a player tracking card.

In one embodiment, the gaming machine is arranged to facilitate manual entry of player identification information by a player and to compare the entered player identification information with stored player identification information so as to verify the identity of the player. The stored player identification information may be stored locally at the gaming machine or stored remotely from the gaming machine and retrieved by the gaming machine in order to verify the identity of a player.

In one embodiment, the gaming machine includes a visible indication usable by a player to readily identify the gaming machine, such as a unique identifier, a defined colour or colour scheme, or a defined lighting scheme.

In one embodiment, the gaming machine is arranged to recognize when a player is present in front of the gaming machine, for example using a camera, and to assume that the player is no longer present when a person is not detected in front of the machine for a defined period of time.

In accordance with a second aspect of the present invention, there is provided a method of gaming including:

providing a gaming machine having a data storage device;

implementing a game at the gaming machine;

generating game state information indicative of the current state of the game as the game is played at the gaming machine by a player;

storing the game state information at the data storage device as the game is played by the player; and retrieving game state information from the data storage device and recommencing play of the game by the player when the game state information is retrieved.

In accordance with a third aspect of the present invention, there is provided a computer program arranged when loaded into a computer to instruct the computer to operate in accordance with a gaming system according to the first aspect of the present invention.

In accordance with a fourth aspect of the present invention, there is provided a non-transitory computer readable medium having computer readable program code embodied therein for causing a computer to operate in accordance with a gaming system according to the first aspect of the present invention.

In accordance with a fifth aspect of the present invention, there is provided a data signal having computer readable program code embodied therein for causing a computer to operate in accordance with a gaming system according to the first aspect of the present invention.

BRIEF DESCRIPTION OF THE DRAWINGS

Certain embodiments of the present invention will now be described, by way of example only, with reference to the accompanying drawings, in which.

Figure 1:
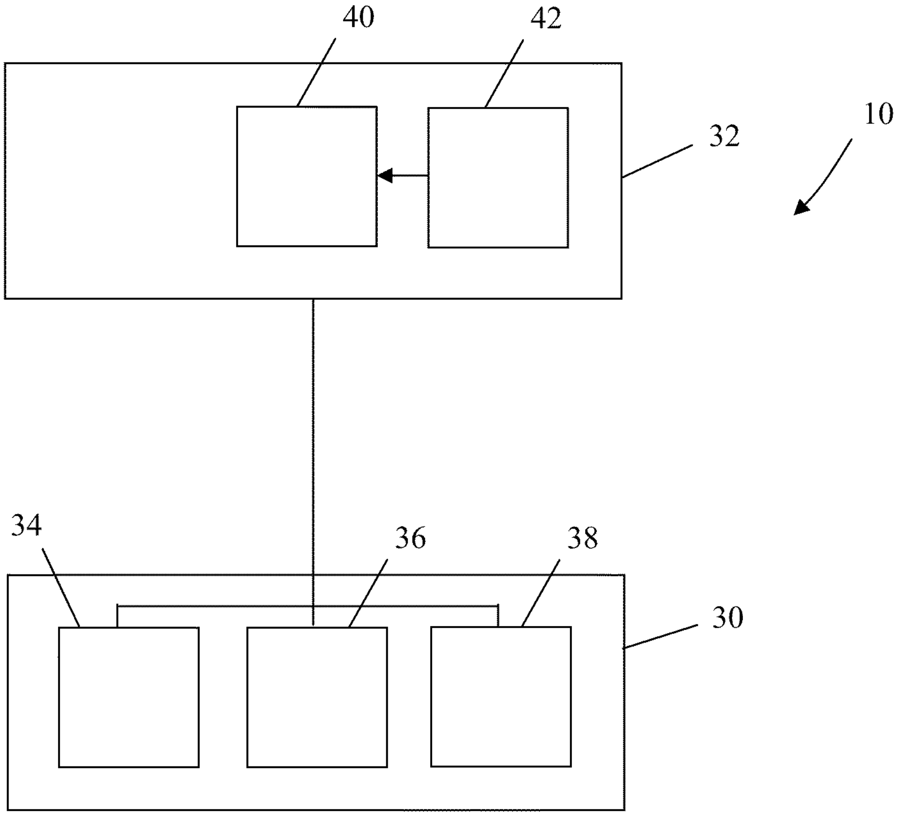
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DESCRIPTION OF CERTAIN EMBODIMENTS OF THE INVENTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

Referring to the drawings, there is shown a schematic block diagram of a gaming system 10 arranged to implement a probabilistic base game of the type wherein several symbols from a set of symbols are randomly displayed, and a game outcome is determined on the basis of the displayed symbols. With some such probabilistic games, the set of symbols include standard symbols and function symbols, and the outcome of the base game is determined on the basis of the displayed standard symbols and the function associated with any displayed function symbol. For example, standard symbols may resemble fruit such as apples, pears and bananas with a win outcome being determined when a predetermined number of the same fruit appear on a display in the same line, scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

The gaming system is arranged to facilitate storage of game state information associated with a game played by a player at a gaming machine and to facilitate retrieval of the game state information associated with the player should the player subsequently return to the gaming machine so that the player may continue with the game.

In this way, the gaming machine on which the game state information is stored becomes linked to the particular game associated with the game state information and the player associated with the game such that the player has an incentive to return to the particular gaming machine in order to continue with the game. In this way, the player develops an affinity for the particular gaming machine which increases player enjoyment.

The game state information may relate to a base game and/or a feature game and may be of a type including a plurality of stages or levels with a player receiving a reward based on the stage or level achieved. For example, the game state information may be associated with a feature game wherein a mission scenario is presented to the player. The outcome of the mission scenario, or the level of the mission scenario achieved, may be skill based, part skill based, or random.

The game state information stored at the gaming machine may include game state information associated with multiple players, and the gaming system may be arranged to reward players based only on their associated game state information or based on a comparison of the game state information. For example, a reward may be provided to the player achieving the highest level of the feature game.

In one embodiment of the present gaming system, operation is such that a feature game is triggered when a defined trigger condition exists during implementation of a base game, which may be occurrence of a defined game outcome, occurrence of a game event during a game such as display of a particular symbol, in response to player input, based on the amount or type of bet placed, when a special game is purchased by a player, or based on any other condition. The feature game in this embodiment is a multi level mission scenario type game and the gaming system is arranged to store game state information indicative of the current game state including the level achieved by a player.

Referring to FIG. 1, a schematic diagram of core components of a gaming system 10 is shown. The core components include a player interface 30 and a game controller 32. The player interface 30 is arranged to enable interaction between a player and the gaming system and for this purpose includes input/output components for the player to enter instructions and play the game.

Components of the player interface 30 may vary but will typically include a credit mechanism 34 to enable a player to input credits and receive payouts, one or more displays 36, at least one of which includes a touch screen, and a game play mechanism 38 arranged to enable a player to input game play instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
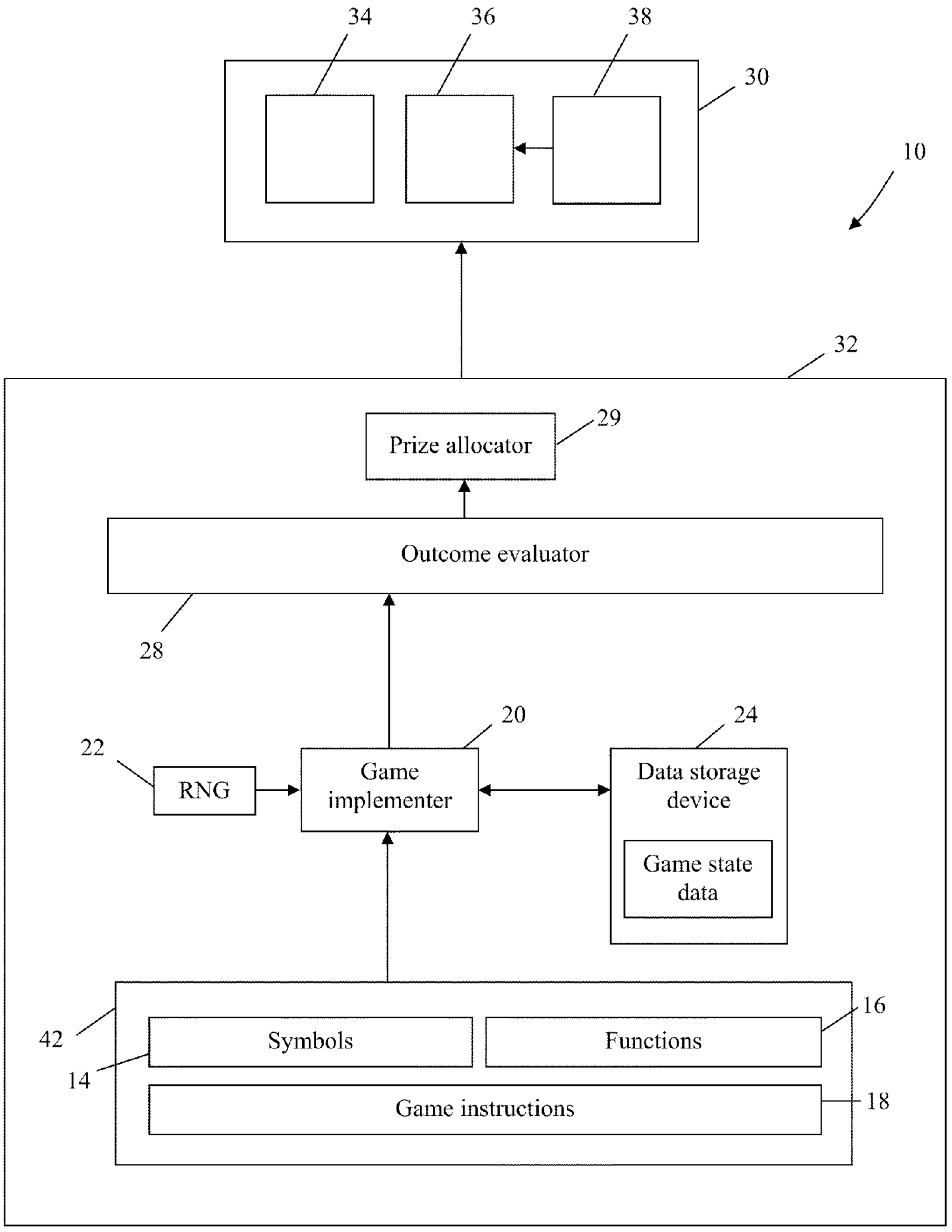
FIG. 2 is a schematic block diagram of functional components of a gaming system in accordance with an embodiment of the present invention.

A functional diagram illustrating operative components of the game controller 32 is shown in FIG. 2.

In this example, the memory 42 is arranged to store symbols data 14 for use in a game. The memory 42 is also arranged to store game instruction data 18 indicative of game instructions usable by the gaming machine 10 to control operation of the game.

The game controller 32 includes a game implementer 20 which is arranged to implement a base game, in this example of a type wherein several symbols are selected from the available symbols 14, for example by spinning reels containing the symbols and stopping the reels so as to display at least one symbol on each reel. In this example, the selection carried out by the game implementer 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

With this embodiment, the game implementer 20 is also arranged to implement a feature game when a trigger condition is determined to exist. A trigger condition may be occurrence of a game event such as a defined game outcome, or may be detection of a defined input from a player.

In this example, the feature game takes the form of a multi-level scenario type game, although it will be understood that any type of feature game is envisaged.

The game controller also has an associated data storage device 24, in this example in the form of a hard drive, for storing game state data 26 associated with a plurality of players. In this example, game state data for each feature game implemented by the gaming system is stored on the hard drive 24 for subsequent retrieval so that the associated player may continue with the game.

The game controller 32 also includes an outcome evaluator 28 which in accordance with the game instructions 18 determines game outcomes during a base game or feature game.

In this example, during a base game the game outcome is based on displayed symbols and defined winning symbol combinations, and during a feature game the game outcome is based on the level of the multi-level game achieved or based on a comparison between game state information associated with the player and game state information associated with other players. However, other alternatives are possible. For example, during a feature game, the game outcome may be based on the level of the game achieved with a bonus awarded based on a comparison between game state information associated with the player and game state information associated with other players.

In the embodiments described below, the game implementer 20 and the outcome evaluator 28 are at least partly implemented using the processor 40 and associated software, although it will be understood that other implementations are envisaged.

The gaming system 10 can take a number of different forms.

In a first form, a stand alone gaming machine is provided wherein all or most components to implement the game are present in a player operable gaming machine.

In a second form, a distributed architecture is provided wherein some of the components to implement the game are present in a player operable gaming machine and some of the components to implement the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
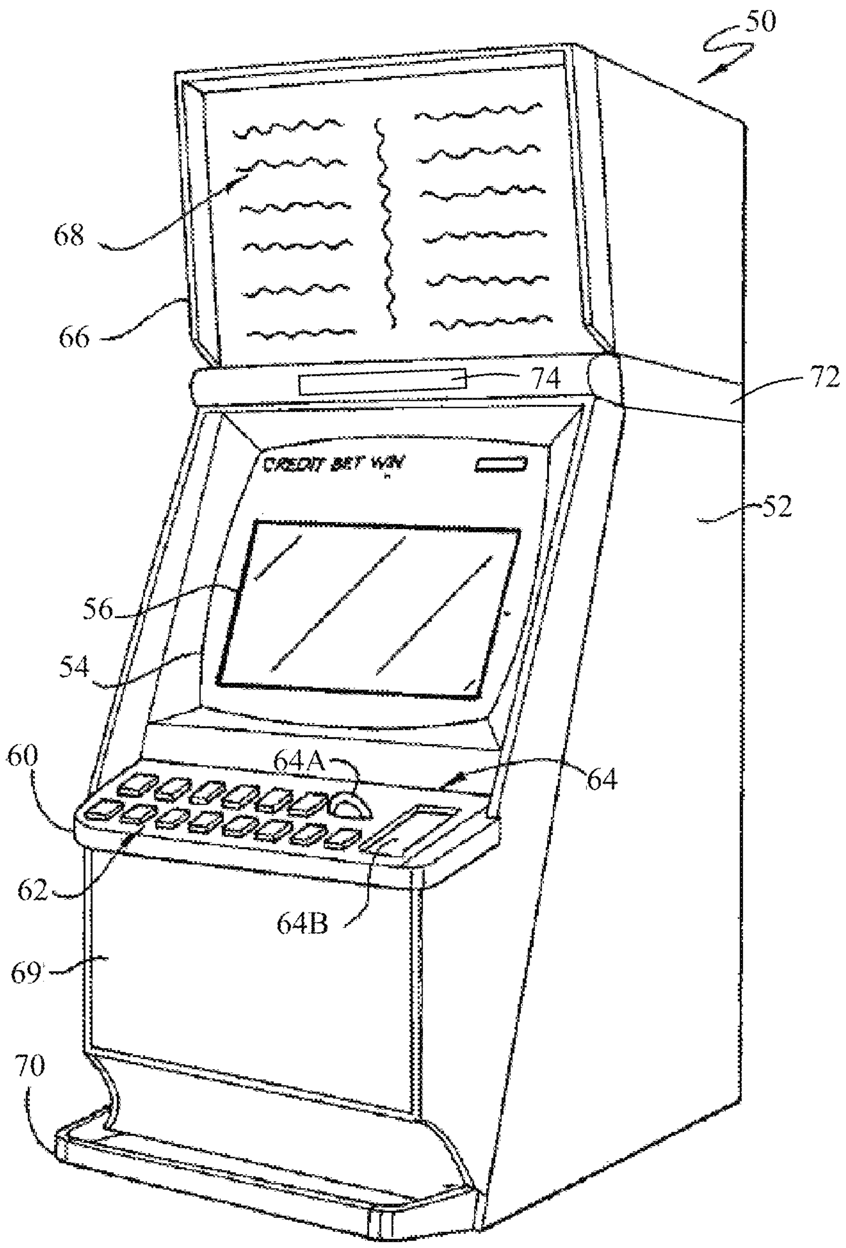
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a primary display 54 on which is displayed representations of a game 56 that can be played by a player. A mid-trim 60 of the gaming machine 50 houses a bank of buttons 62 for enabling a player to interact with the gaming machine, in particular during game play. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 in this example includes a secondary display 68 on which a feature game is implemented, although it will be understood that, as an alternative, the feature game may be implemented on the primary display 54. Artwork and/or information may be provided on a front panel 69 of the console 52. A coin tray 70 is mounted beneath the front panel 69 for dispensing cash payouts from the gaming machine 50.

The or each display 54, 68 may be in the form of a video display unit, particularly a cathode ray tube screen device. Alternatively, the or each display 54, 68 may be a liquid crystal display, plasma screen, or any other suitable video display unit. In the present embodiment wherein the secondary display is used to implement a feature game, the secondary display 68 includes a touch screen usable by a player to control movement of an object during feature game play. In an alternative embodiment wherein the primary display is used to implement a feature game, the primary display 54 includes a touch screen.

The primary display 54 in this example is arranged to display representations of several reels, each reel of which has several associated symbols. Typically 3, 4 or 5 reels are provided. During operation of a base game, the reels first appear to rotate then stop with typically three symbols visible on each reel. Base game outcomes are determined on the basis of the visible symbols together with any special functions associated with the symbols.

A player tracking module (PTM) 72 having a display 74 is also provided. The PTM 72 allows the player to interact with a player loyalty system. The PTM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PTM 72 is a Sentinel III device produced by Aristocrat Technologies Pty Ltd.

The PTM 72 also functions to identify a player for the purpose of identifying game state information associated with the player in the data storage device 24 so that desired game state information can be retrieved by the gaming machine and the game associated with the game state information continued, or for the purpose of storing new game state information and associating the game state information with the correct player.

While the present embodiment uses a PTM 72 to identify a player, it will be understood that alternatives are possible. For example, the gaming system 10 may be arranged so as to facilitate identification of a player by receiving identification information from a player such as login and password information, for example using a touch screen, using biometric sensors, RFID readers, or in any other way.

After a player has been identified, the gaming system may be arranged so that it is assumed that the identity of the player remains the same until an indication is received to indicate that the player may no longer be present or may have changed. For example, if no input or coin-in is received from a player for a defined period of time, the gaming system may be arranged to assume that the player is no longer present. Alternatively, the gaming system may include a video camera and the gaming system arranged to recognise when a person is present in front of the gaming machine and to assume that the player is no longer present when a person is not detected in front of the machine for a defined period of time.

In order to facilitate identification of a gaming machine by a prospective player, each gaming machine may be provided with a unique identifier, defined colour schemes, defined lighting schemes, a scrolling leaderboard, or any other identification arrangement. The gaming system may also be arranged to provide each player with a ticket which identifies the stored game(s) and gaming machines on which the games are stored.

Figure 4:
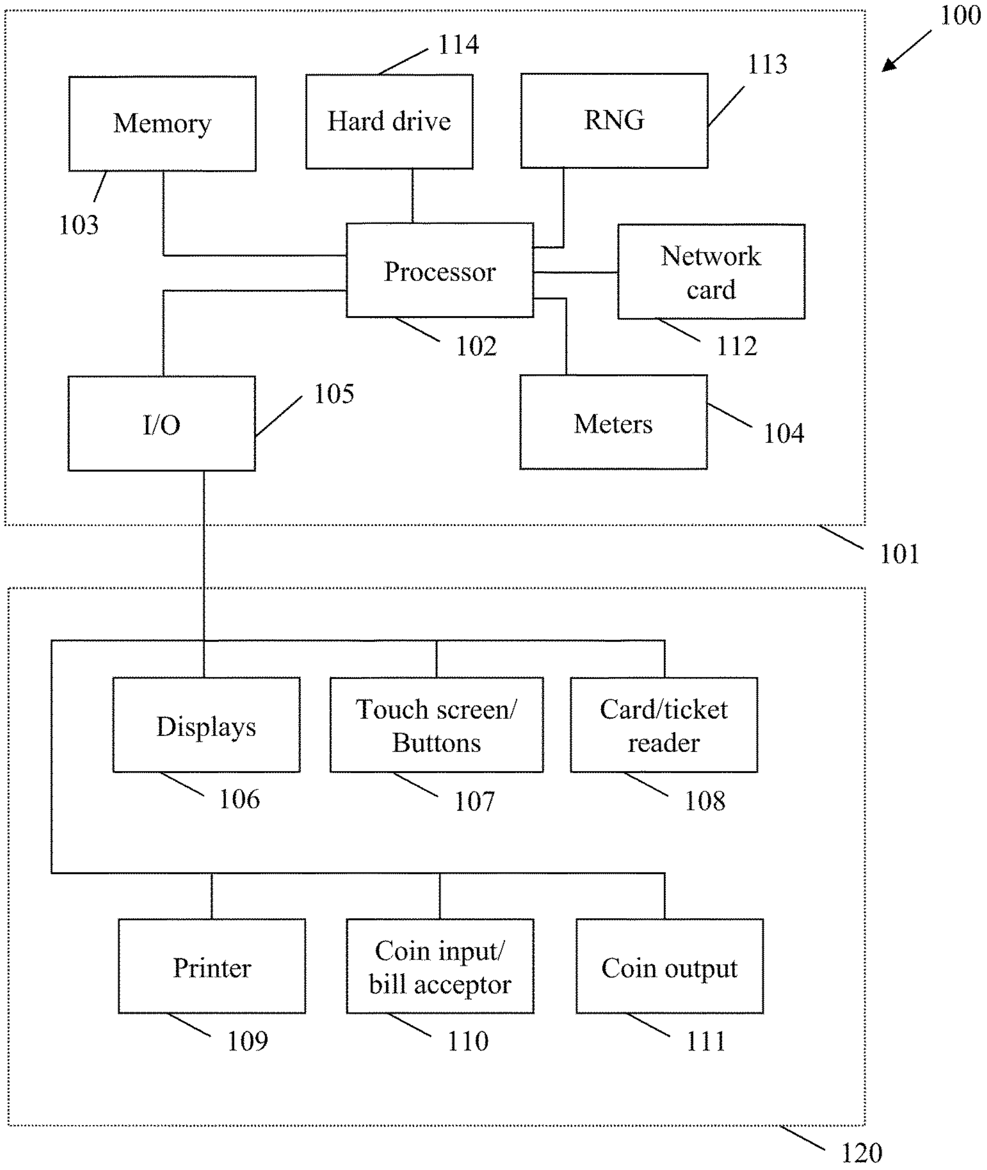
FIG. 4 is a schematic block diagram of operative components of the gaming machine shown in FIG. 3.

FIG. 4 shows a block diagram of operative components of a gaming machine 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
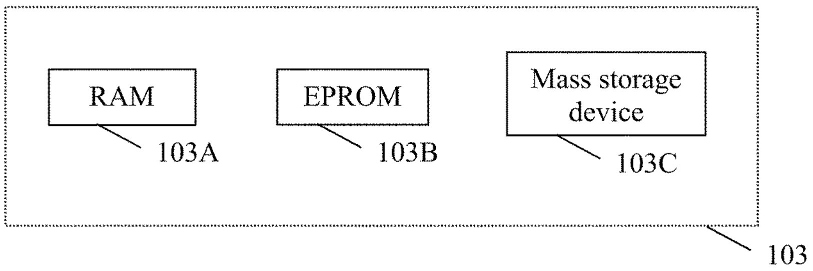
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The game controller 101 also includes a data storage device, in this example in the form of a hard drive 114, arranged to communicate with the processor 102 and to store and retrieve game state data. While the hard drive 114 in FIG. 4 is shown separate to the memory 103, it will be appreciated that the hard drive may constitute the mass storage device 103C shown in FIG. 5, with a portion of the mass storage device dedicated to storing game state data.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 include one or more displays 106, a touch screen and bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

Figure 6:
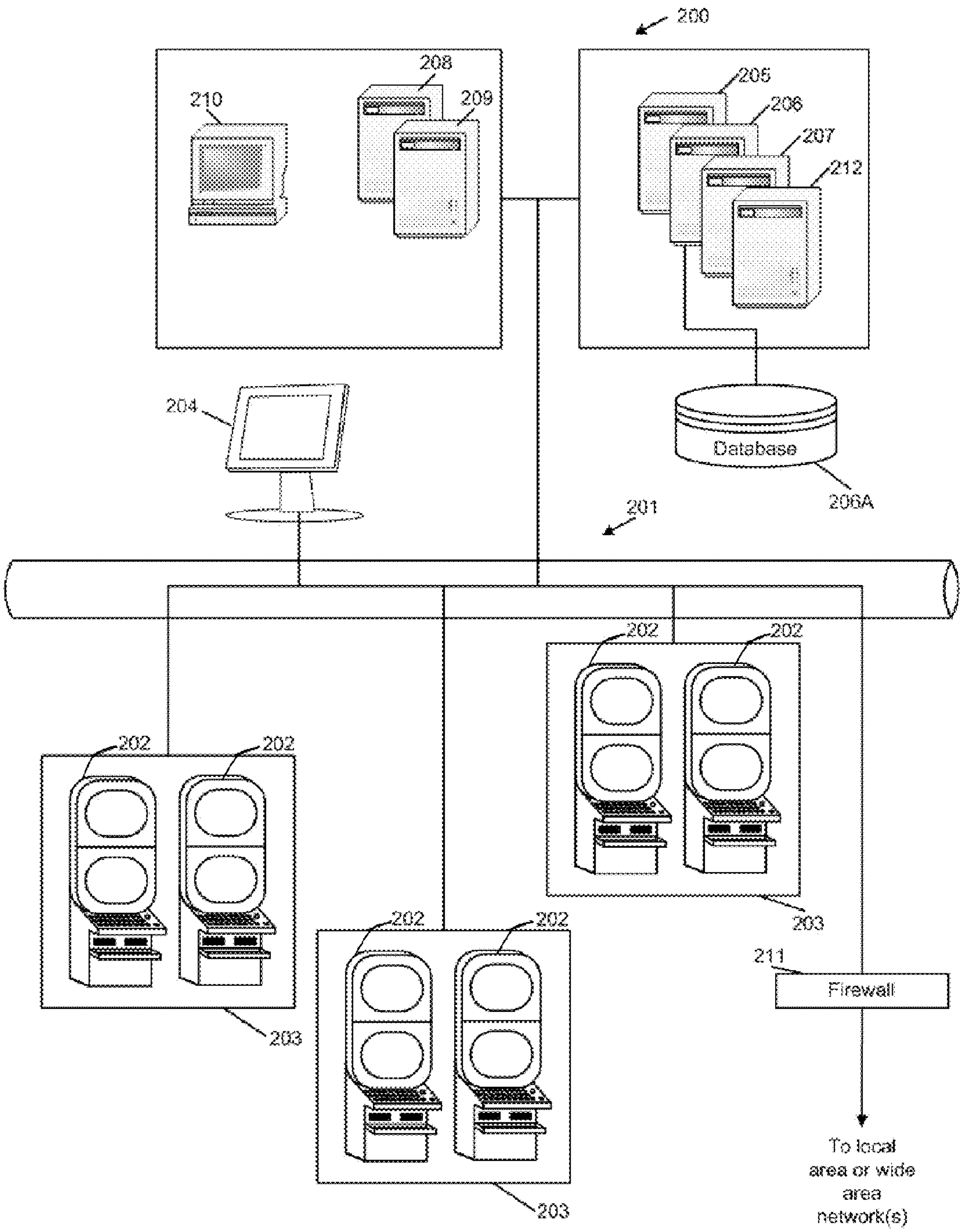
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, two banks 203 of two gaming machines 202 are connected to the network 201. The gaming machines 202 provide a player operable interface and may be the same as the gaming machines 40,100 shown in FIGS. 3 and 4, or may have simplified functionality depending on the rules, guidelines, requirements, and/or preferences to implement game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

The gaming system 200 also includes a loyalty program server 212 and a feature database 214.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

A specific example will now be described in relation to flow diagram 250 shown in FIG. 7 which illustrates steps 252 to 270 of a method of gaming implemented by a gaming system. In this example, the gaming machine is a stand alone gaming machine 50.

Figure 7:
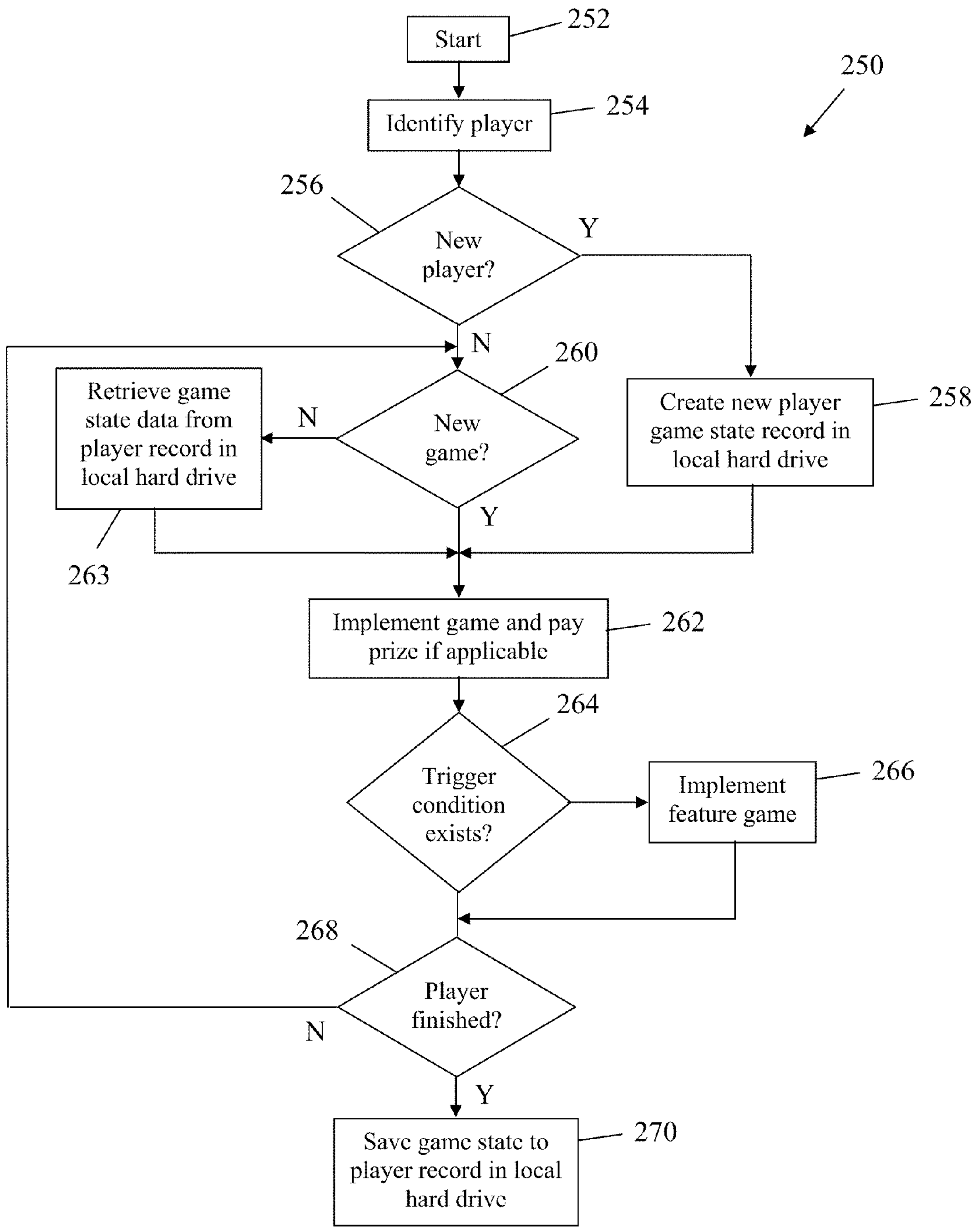
FIG. 7 is a flow diagram illustrating game play of a gaming system in accordance with an embodiment of the present invention.

FIG. 7 depicts an example flow diagram representative of processes that may be implemented using, for example, computer readable instructions that may be used to facilitate game play. The example processes of FIG. 7 may be performed using a processor, a controller and/or any other suitable processing device. For example, the example processes of FIG. 7 may be implemented using coded instructions (e.g., computer readable instructions) stored on a tangible computer readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIG. 7 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 7 may be implemented manually or as any combination(s) of any of the foregoing techniques, for example, any combination of firmware, software, discrete logic and/or hardware. Further, although the example processes of FIG. 7 are described with reference to the flow diagram of FIG. 7, other methods of implementing the processes of FIG. 7 may be employed. For example, the order of execution of the blocks may be changed, and/or some of the blocks described may be changed, eliminated, sub-divided, or combined. Additionally, any or all of the example processes of FIG. 7 may be performed sequentially and/or in parallel by, for example, separate processing threads, processors, devices, discrete logic, circuits, etc.

During a base game, a plurality of reels are provided, with each reel including standard symbols and optionally one or more function symbols. Win outcomes are determined on the basis of the symbols visible at the display positions when the reels stop rotating.

In this example, five virtual reels are provided and, as such, representations of the reels are displayed on a graphical display device 54 of a gaming machine 50.

The gaming system is arranged to implement one or more feature games. A feature game may commence automatically on the basis of occurrence of a trigger condition, such as a game event occurring during a base game, or in response to player input.

As indicated at step 254, prior to commencing play of a game at a gaming machine, a prospective player is first identified, for example by the player inserting a player tracking card into the PTM 72 of the gaming machine or by entering login and password information into the gaming machine, for example using a touch screen. After identification is received at a gaming machine, a check is made to determine whether the player is registered with the system by comparing player information received from a player tracking card or embodied in the login information with stored player identification information. Player identification information may be stored locally at each gaming machine or may be stored remotely from the gaming machine, for example at a loyalty program server 212.

If the player is not already associated with the system, a registration procedure may be invoked wherein a player tracking card is issued to the player and/or login and password information communicated to the player and stored in the loyalty program server. A new player game state record is created in the local gaming machine hard drive 24 as indicated at steps 256 and 258. Each game state record is capable of holding game state data associated with one or more games played by the player associated with the game state record.

If the player is already associated with the gaming system, the player decides at step 260 whether to play a new game or continue with an existing game. If the player decides to continue with an existing game, the game state record associated with the player is retrieved from the local hard drive using player identification data retrieved from a player tracking card or entered by the player as login/password information, and the game state data relevant to the game desired to be continued by the player extracted from the game state record, as indicated at step 263.

The gaming system then implements the desired game, whether a new game or a continuation of an existing game, and prizes are paid if applicable.

In the present example, as indicated at steps 264 and 266, if a trigger condition is determined to exist, for example at least 3 scattered special symbols, a feature game is implemented which may be complementary to or different to the base game.

As indicated at step 268, the player may choose to finish the game, and as a consequence of finishing the game, game state information indicative of the current status of the game is stored in the local hard drive, as indicated at step 270.

The game state information may include game state information associated with one or more base games played by the player and/or one or more feature games played by the player. For example, in an embodiment wherein a multi-level mission scenario type feature game is implemented, the game state information may be indicative of only the level achieved in the feature game. Alternatively, the game state information may be indicative of one or more, or all, game related events occurring during both base games and feature games, including wins achieved, coin in, and so on.

During a feature game, the prizes paid may be based on the game state information associated only with the current game, such as the current level achieved, and/or based on a comparison between the current game state information and stored game state information associated with other players. In the latter example, it will be understood that a community or tournament experience is provided to a player even though the tournament is not occurring real-time.

It will be appreciated by persons skilled in the art that numerous variations and/or modifications may be made to the invention as shown in the specific embodiments and/or aspects without departing from the spirit or scope of the invention as broadly described. For example, it will be apparent that certain features of the invention can be combined to form further embodiments. The present embodiments and aspects are, therefore, to be considered in all respects as illustrative and not restrictive.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A gaming machine comprising:

a credit input mechanism configured to receive a credit input from a first player, the credit input mechanism comprising at least one of a bill collector, a coin input chute, a ticket reader, and a card reader, wherein the game machine is configured to establish a monetary credit balance associated with the first player based at least in part on the credit input;

a data storage device; and a game controller configured to:

implement a game associated with a wager of the first player, the wager decreasing the credit balance;

generate current game state information indicative of the current state of the game as the game is played by the first player, wherein the current game state information is associated with a player identifier established for the first player and indicates game related events achieved by the first player;

store the current game state information on the data storage device as the game is played by the first player;

suspend play of the game by the first player when the first player is determined to be inactive, wherein the first player is determined to be inactive when a button of the gaming machine associated with placing a wager is not actuated for a defined period of time;

store the current game state information associated with the player identifier in the data storage device when play of the game by the first player is suspended;

retrieve the current game state information from the data storage device when the first player reinitiates gameplay on the gaming machine and provides the player identifier; and recommence play of the game by the first player in accordance with the game related events achieved by the first player when the current game state information is retrieved.

2. A gaming machine as claimed in claim 1, wherein the game comprises a base game and a feature game, and the game controller is configured to implement the base game and, based on defined criteria to implement the feature game, the game state information relating to at least one of the base game and the feature game.

3. A gaming machine as claimed in claim 1, wherein the game state information comprises information indicative of a degree of progress achieved by the first player through the game.

4. A gaming machine as claimed in claim 1, wherein the game implemented by the game controller comprises a plurality of game levels and the game state information includes information indicative of a game level of the plurality of game levels achieved by the first player.

5. A gaming machine as claimed in claim 1, wherein the outcome of the game implemented by the game controller is at least partially random.

6. A gaming machine as claimed in claim 1, wherein the gaming machine is configured to provide an award based on a degree of progress through the game achieved by the first player.

7. A gaming machine as claimed in claim 1, wherein the data storage device is configured to store game state information associated with a plurality of players.

8. A gaming machine as claimed in claim 7, wherein the game controller is configured to provide an award based on a comparison between respective game state information associated with the plurality of players.

9. A gaming machine as claimed in claim 1, wherein the game controller is configured to identify the first player and to associate the current game state information with the identified first player.

10. A gaming machine as claimed in claim 9, wherein the gaming machine comprises a player identification device configured to read player identification information from a player identifier associated with the first player.

11. A gaming machine as claimed in claim 10, wherein the player identification device forms part of a player tracking module and the player identifier forms part of a player tracking device associated with the first player.

12. A gaming machine as claimed in claim 11, wherein the player tracking device comprises a player tracking card.

13. A gaming machine as claimed in claim 9, wherein the gaming machine is configured to facilitate manual entry of player identification information by the first player and to compare the entered player identification information with stored player identification information to verify the identity of the first player.

14. A gaming machine as claimed in claim 13, wherein the stored player identification information is stored locally at the gaming machine.

15. A gaming machine as claimed in claim 13, wherein the stored player identification information is stored remotely from the gaming machine and retrieved by the gaming machine in order to verify the identity of the first player.

16. A gaming machine as claimed in claim 1, wherein the gaming machine comprises a visible indication usable by the first player to identify the gaming machine.

17. A gaming machine as claimed in claim 16, wherein the visible indication comprises at least one of a unique identifier, a defined colour or colour scheme, and a defined lighting scheme.

18. A method of gaming comprising:

providing a gaming machine with a data storage device;

receiving a credit input from a first player at a credit input mechanism comprising at least one of a bill collector, a coin input chute, a ticket reader and a card reader;

establishing a monetary credit balance associated with the first player based at least in part on the credit input;

implementing a game associated with a wager of the first player at the gaming machine, the wager decreasing the credit balance;

generating current game state information indicative of the current state of the game as the game is played at the gaming machine by the first player, wherein the current game state information is associated with a player identifier established for the first player and indicates game related events achieved by the first player;

storing, on the data storage device, the current game state information as the game is played by the first player;

determining the first player is inactive when a button of the gaming machine associated with placing a wager is not for a defined period of time;

suspending play of the game by the first player when the first player is inactive, wherein the current game state information associated with the player identifier is stored in the data storage device when play of the game by the first player is suspended;

retrieving the current game state information from the data storage device when the first player reinitiates gameplay on the gaming machine and provides the player identifier; and recommencing play of the game by the first player in accordance with the game related events achieved by the first player when the current game state information is retrieved.

19. A method as claimed in claim 18, comprising implementing a base game and, based on defined criteria, implementing a feature game, the game state information relating to at least one of the base game and the feature game.

20. A method as claimed in claim 18, wherein the game state information comprises information indicative of a degree of progress achieved by the first player through the game.

21. A method as claimed in claim 18, comprising implementing a game having a plurality of game levels, the game state information including information indicative of a game level of the plurality of game levels achieved by the first player.

22. A method as claimed in claim 18, comprising implementing a game wherein the outcome of the game is at least partially random.

23. A method as claimed in claim 18, comprising providing an award based on a degree of progress through the game achieved by the first player.

24. A method as claimed in claim 18, comprising storing game state information associated with a plurality of players in the data storage device.

25. A method as claimed in claim 24, comprising providing an award based on a comparison between respective game state information associated with the plurality of players.

26. A method as claimed in claim 18, comprising identifying the first player and associating the current game state information with the identified first player.

27. A method as claimed in claim 26, comprising reading player identification information from a player identifier associated with the first player.

28. A method as claimed in claim 26, comprising receiving identification information from the first player and comparing the entered player identification information with stored player identification information to verify the identity of the first player.

29. A method as claimed in claim 28, comprising storing the stored player identification information locally at the gaming machine.

30. A method as claimed in claim 28, comprising storing the stored player identification information remotely relative to the gaming machine.

31. A method as claimed in claim 18, comprising providing the gaming machine with a visible indication usable by the first player to identify the gaming machine.

32. A method as claimed in claim 31, wherein the visible indication comprises at least one of a unique identifier, a defined colour or colour scheme, and a defined lighting scheme.

* * * * *